United States Patent [19]

Fawcett

[11] 4,223,564

[45] Sep. 23, 1980

[54] SELF CENTERING DEVICE FOR PUSH-PULL CONTROL COAXIAL CABLES

[75] Inventor: Harry E. Fawcett, Tacoma, Wash.

[73] Assignee: Cablecraft, Inc., Tacoma, Wash.

[21] Appl. No.: 970,187

[22] Filed: Dec. 18, 1978

[51] Int. Cl.² .............................................. F16C 1/10
[52] U.S. Cl. ..................................... 74/501 R; 74/470
[58] Field of Search .................. 74/470, 501.5 R, 502, 74/501 R

[56] References Cited

U.S. PATENT DOCUMENTS

| | | | |
|---|---|---|---|
| 1,200,199 | 10/1916 | Johnson | 267/8 R |
| 2,186,653 | 1/1940 | Penote | 74/470 |
| 3,096,663 | 7/1963 | Sink | 74/481 |
| 3,109,318 | 11/1963 | Kahn et al. | 74/470 |
| 3,898,891 | 8/1975 | Colloton | 74/474 |
| 4,059,025 | 11/1977 | Waack et al. | 74/482 |

Primary Examiner—Kenneth Dorner
Attorney, Agent, or Firm—Christensen, O'Connor, Johnson & Kindness

[57] ABSTRACT

Self-centering action in a push-pull coaxial cable is provided by an encapsulated spring loaded device formed to be mounted as a collar encircling the end assembly of the cable by threading its inner tubular member on the conventional cable's load actuation rod and by interconnecting its outer tubular member with the cable mounting fixture or with the latter's anchor support. Occupying only a small annular space around the cable's end assembly without projecting lengthwise beyond it, the device responds to relative displacement of the cable members in either direction from a neutral position by spring reaction force that increases with displacement.

15 Claims, 3 Drawing Figures

U.S. Patent    Sep. 23, 1980    4,223,564
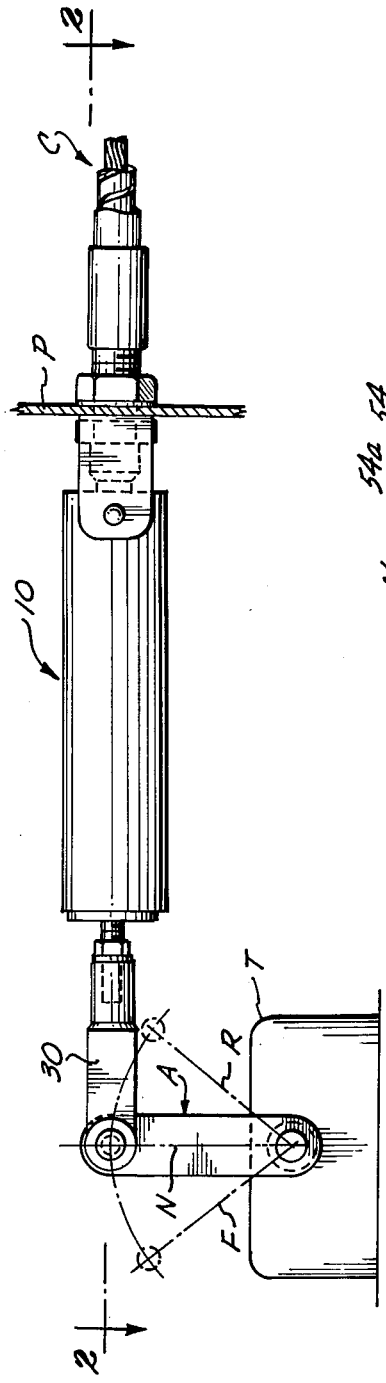
Fig.1.
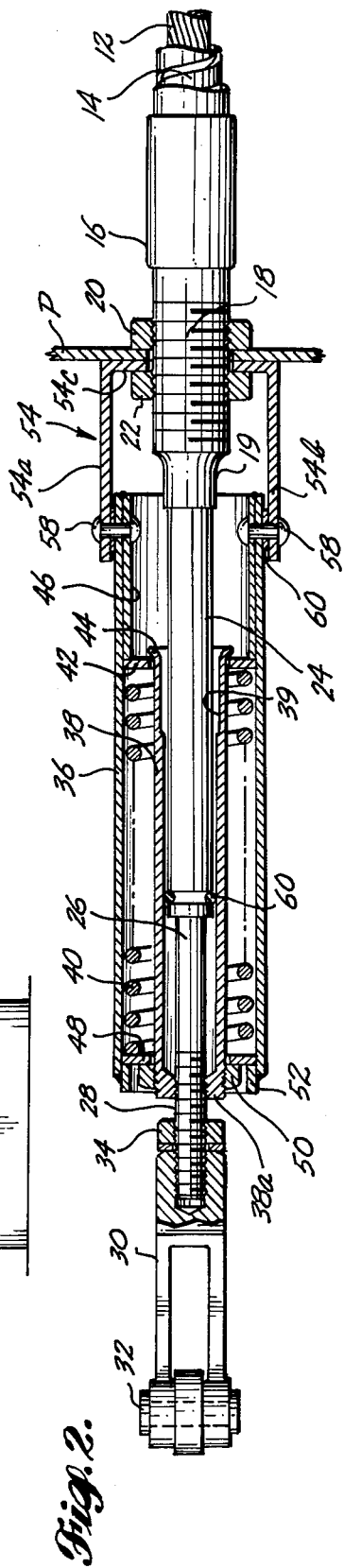
Fig.2.
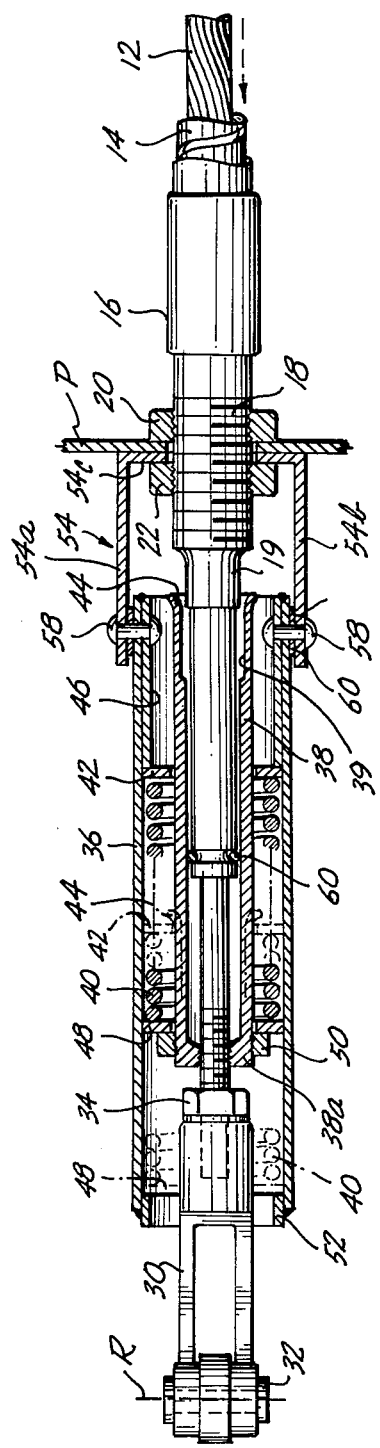
Fig.3.
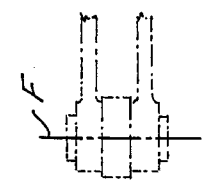

SELF CENTERING DEVICE FOR PUSH-PULL CONTROL COAXIAL CABLES

BACKGROUND OF THE INVENTION

This invention relates to improvements in push-pull coaxial cable control apparatus and, more particularly, relates to a self-centering means that can be installed on existing control cables or as part of a new control cable for the purpose of imparting spring return force to the cable members in response to relative movement thereof out of a predetermined intermediate or neutral position. The invention is herein illustratively described by reference to its presently preferred embodiment; however, it will be recognized that certain modifications and changes therein with respect to details may be made without departing from the essential features involved.

The invention has many uses including but not limited to remote control of gear shifting in hydrostatic transmissions for agricultural tractors, harvestors, in-plant floor sweepers, etc. Because of the tendency of hydrostatic transmissions to creep out of neutral position unless restrained while the drive engine continues to run at operating speed, self-centering spring devices have been added that will exert a return force on the transmission shifter arm whenever it is moved out of neutral position. Typically, such devices were connected between the shifter arm and an external bracket specially provided or an existing part of the chassis structure suitable for the purpose. Such spring return devices heretofore used consisted of coaxial outer and inner tubular members with an elongated helical spring received in the annular space between the members and, with the shifter arm in neutral position, maintained in a partially compressed state by opposing sets of abutment elements or stops carried by the respective members. Relative longitudinal movement imposed on the tubular members in either direction, such as during shifting of the transmission out of neutral into either forward or reverse gear positions, caused further compression of the spring within the device. For most transmissions a pre-compression spring force of approximately forty pounds and a maximum displacement compression force of about eighty pounds served to prevent transmission creep without also forcing the transmission out of gear in its forward or reverse settings.

The present invention employs a self-centering device operating on the same mechanical principles and indeed one preferably that is constructed generally with the same functional combination of coaxial tubular members, helical spring, and associated stop elements as heretofore employed in the above-described application to hydrostatic transmissions. The primary objective of the present invention is the more specific one of providing a more economical and versatile mechanical mounting for self-centering spring devices used in conjunction with push-pull coaxial cable remote control systems. By eliminating the necessity for separate external mountings and by also avoiding the necessity of finding suitable available space in which the self-centering device may be installed and operated, the feasibility of utilizing such a device where needed is virtually assured by this invention either in existing systems or in new systems regardless of space or mounting limitations thereof. A more specific object is to provide a neutral position return spring mechanism for push-pull cables that can be mounted directly on the cable terminal assembly with simple interconnections made between its relatively movable actuation elements and without necessity for any special adaptation or modifications of the conventional cable assembly for that purpose.

Still another object hereof is to provide a new and improved self-centering device for easy direct mounting upon a coaxial push-pull cable, with one actuation member of the device simply threaded over the cable load actuator rod in position for its other actuation member to be interconnected with the cable mounting fixture, directly or by way of the same support panel or other anchoring device holding that fixture.

A specific object hereof is to devise a versatile push-pull cable apparatus incorporating, in combination therewith, a compact and relatively inexpensive, conveniently mounted self-centering device that adds nothing to the length of the cable assembly and adds negligibly to the bulk or girth of the terminal portion thereof when installed.

BRIEF DESCRIPTION OF THE INVENTION

In accordance with this invention the self-centering spring mechanism, intended to apply neutral position return force to the load actuator device with which the push-pull cable members are connected, is formed as a tubular attachment capsule that mounts as a collar closely encircling the end assembly of the push-pull cable device. The projecting load actuation rod terminating the core cable projects through and beyond the self-centering device inner tubular member and is connected to it by utilizing its existing threads to engage matching threads provided in the tubular member. The outer or sheath cable of the push-pull cable device is connected to the opposing or outer tubular member of the self-centering device by way of attachment of the cable's outer mounting fixture or to its support.

Positioned back of the end extremity of the cable mechanism, the installed self-centering or spring loaded capsule imposes no added length requirement, whereas its close encirclement of the cable end assembly permits its use even in those installations where lateral space around the control cable is at a premium. Mounting upon conventionally constructed coaxial cable assemblies in direct and simple manner can be effected quickly and easily either with new cables at the factory or with existing cables already embodied in control system installations. With appropriate fastening elements the device can be installed on either or both ends of a control cable, as desired.

BRIEF DESCRIPTION OF THE DRAWINGS

FIG. 1 is a side elevation view showing the invention applied to a push-pull control cable connected to actuate a hydrostatic transmission shifter arm.

FIG. 2 is a longitudinal sectional view taken on line 2—2 in FIG. 1 to illustrate the self-centering spring mechanism centered, corresponding to the neutral position of the transmission shifter arm.

FIG. 3 is a view similar to FIG. 2 illustrating by solid lines the parts in one extreme position and by broken lines the parts in the opposite extreme position, such as the forward and reverse positions of the truck transmission.

DETAILED DESCRIPTION OF THE PREFERRED EMBODIMENT

In the drawings, the invention is depicted as applied to a typical push-pull coaxial cable C connected to actuate the shifter arm A of a hydrostatic drive transmission B. Control is effected by shifting the arm between its neutral setting N and either of the opposite extreme positions designated F and R, corresponding to forward and reverse drive settings of the transmission. The self-centering spring device 10 mounted on the end assembly of the control cable will be described in detail hereafter; suffice it to state at this point that it functions to impose a substantial return force on the shifter arm A in response to appreciable displacement of the arm out of position N, and that the force increases as a function of that displacement regardless of the direction in which it occurs.

In its illustrative form, the push-pull coaxial cable mechanism itself, C, comprises a central or core cable 12 surrounded by a sheath or conduit cable 14. Outer cable 14 terminates in a mounting fixture 16 threaded over a portion of its length at 18 to receive jamb nuts 20 and 22 designed to clamp against opposite sides of a support such as the mounting panel P through which the fixture passes. The mounting fixture 16 terminates in an extension sleeve 24. The core conductor 12 terminates in a load actuation rod 26 that projects through and beyond the fixture 16 including its sleeve extension 24. A sliding seal (not shown) closes the annular gap between the rod 26 and the entrance of sleeve 24 to prevent infiltration of moisture and dirt particles. Actuator rod 26 is threaded over a portion of its projecting length at 28 to engage in the threaded socket of a connecting clevis 30 linked by pivot pin 32 to the transmission actuator arm A. A jamb nut 34 on the rod 26 bears against the end of the clevis to tighten the connection.

In this conventional cable assembly and its conventional connection by way of the clevis 30 to the transmission shifter arm A, relative longitudinal movement of the cable members effected at a remote point, such as in the truck cab, causes the shifter arm A to be moved between neutral position N and either the forward or reverse gear setting positions, F or R, as shown. The stationary mounting panel P to which the mounting fixture 16 is secured takes the reaction force attending forced movement of the shifter arm A.

In accordance with this invention, self-centering action for the control cable assembly, and thereby for the shifter arm A with which it is connected for actuation purposes, is effected by means of the device 10, which as a preassembled unit in the form of a washer is installed over the projecting end assembly of the cable on the side of the mounting panel P facing the actuator arm A. The self-centering device comprises outer and inner elongated tubular members 36 and 38 forming an annular space between them in which the elongated helical spring 40 is received. At one end of this space the spring abuts a washer 42 that slides freely over the tubular member 38 and within the tubular member 36. As such, washer 42 serves as an interface between the end of the spring and either of two stop elements, one comprising the outturned flange 44 on the adjacent end of inner tubular member 38, and the other comprising a washer fixed inside the end of tubular member 36. At its opposite end the spring 40 abuts against a second washer 48 in similar sliding relationship with the tubular members and serving as an interface between the adjacent end of the spring 40 and a first stop element in the form of a nut 50 threaded onto the end of inner tubular member 38, and a second stop element comprising a washer 52 welded in place in the open end of the outer member 36. At that same end of the assembly, the inner tubular member 38 has an inturned flange 38a which is internally threaded so that it can be threaded on the threaded portion 28 of the load actuator rod 28. It is screwed onto the rod in this manner until it has advanced the assembly to a position where its mounting bracket 54 abuts the support panel P. An "O"-ring seal 60 is provided in the annular gap between extension sleeve 24 and the interior of tubular member 38. The latter is slightly expanded in its interior diameter at 39 to accommodate the neck 19 at the base of sleeve 24 with the rod 28 fully retracted.

Mounting bracket 54 has opposite side portions 54a and 54b that are connected by transversely aligned rivets 58 passing through aligned holes in the collar 46, in the side portions 54a and 54b and in intermediate washers 60. The aligned rivets provide a transverse pivot means for the device 10 permitting it to swing in a vertical plane the slight amount that is necessary to accommodate the arc of swing of the shifter arm A. The connecting portion 54c of bracket 54 is apertured to pass the mounting fixture 18 and to be clamped against the panel P by the jamb nuts 20 and 22 in the final installation of the device.

As will be seen in FIG. 2, the sets of opposing stop elements carried by the inner and outer tubular members are spaced longitudinally such that spring 40 is partially compressed in the neutral or centered position of the parts. Moreover, the spacings between such stop elements is such that the washers at the respective ends of the spring engage the stop elements carried by the outer tubular member while also engaging the stop elements carried by the inner tubular member. If desired, the nut 50 may be advanced further on the inner tubular member 38 so as to make the spacing between stop elements 50 and 44 less than that between stop elements 52 and 46. This adjustment creates a degree of lost motion permitting the members of the push-pull cable assembly C to be moved out of neutral position N for the arm A a certain distance before the spring takes effect to resist further displacement. It will also be evident that pre-compression of spring 40 could be governed alternatively by the spacing between stop elements 52 and 46. In any event, the spacing between stop elements of one set (such as 50 and 44) at least approximates that between the stop elements (52 and 46) of the other set. It is preferred, however, that the arrangement shown in FIG. 2 be employed, wherein the pre-compression force of return spring 50, established by the initial space between the washers preferably at about forty pounds in the typical application, becomes effective the instant the shifter arm A moves out of neutral position N. The spring constant is preferably selected such that the return force exerted by the spring on the actuator arm increases to about eighty pounds as the actuator arm reaches either of its opposite gear shift positions F or R as shown. This maximum displacement force exerted by the spring 40 tending to return the actuator arm to its neutral position should be such that it does not force the gear shift mechanism out of either its forward or reverse gear settings into which it is placed by the control cable C. In either of these two opposite positions of the actuator assembly as shown in FIG. 3 the spring 40 reaches its most fully compressed state as depicted. The action is bilateral, movement of the cable members in one direction being effective to compress the spring through the washers by one pair of stops at the respective ends of the spring picking up the washers, the same as relative movement in the opposite direction causes the other pair of stops to pick up the washers and compress the spring.

It will therefore be appreciated that the invention has provided a highly compact, easily installed and relatively inexpensive self-centering spring device and cable mechanism combination, with the device mounting location, form and spatial requirements suiting the same for use in a wide variety of applications at either or both ends of a control cable, and making it particularly advantageous in those applications in which space conservation both endwise and laterally of the terminal assembly of the control cable system as well as those wherein availability of external structures for mounting a separate self-centering device presents a problem. As will be seen from the illustrated embodiment, in order to install the self-centering device in combination with the cable, assuming the cable is already installed and coupled to the clevis 30, it is merely necessary to remove the clevis pin 32, detach the clevis 30 and nut 34, remove the jamb nut 22 from the mounting fixture 18, slip the mounting bracket 54 over the projecting end assembly of the cable C, following the bracket 54 by the jamb nut 22 and thereafter threading the inner tubular member 38 along the actuator rod 28 until it is in the correct position to place the mounting bracket 54c against the mounting panel P. Thereupon the jamb nut 22 is tightened against the bracket to hold it in place against the panel.

These and other aspects of the invention will be evident to those skilled in the art based on an understanding of the disclosed embodiment thereof. Minor modifications and changes with respect to detail may be made without departing from the essential features involved as set forth in the appended claims that follow.

The embodiments of the invention in which an exclusive property or privilege is claimed are as follows:

1. In combination with a push-pull coaxial cable mechanism adapted to move an actuatable device reversibly through a range between opposite extreme positions, which range includes an intermediate neutral position, said cable mechanism including an inner core cable member slidably received within an outer tubular guide cable member, and a cable mechanism terminal assembly including an outer mounting fixture terminating said outer cable member and a device actuator rod terminating said inner cable member and projecting reciprocatively through said mounting fixture by distances beyond said mounting fixture that vary with relative longitudinal movement between the cable members;

neutral position return spring mechanism for said cable mechanism including an elongated outer tubular member surrounding said rod and interconnected with said mounting fixture, an elongated helical spring surrounding said rod and extending longitudinally within said outer tubular member, and opposing abutment means at opposite ends of the spring including elements operable on said spring by relative approach and separation movement between said elements to vary the degree of compressive shortening of said spring with actuator positioning movement of the cable members, said abutment means including a first set of opposing stop elements and support means for said stop elements, said support means being affixed to the rod member and extending longitudinally within said outer tubular member to maintain said opposing stop elements of the first set in longitudinally spaced relationship, and a second set of opposing stop elements carried by said outer tubular member at a longitudinally spacing therebetween at least approximating the longitudinal spacing between said stop elements of the first set.

2. The combination defined in claim 1 wherein the spring mechanism includes retainer washers surrounding the rod and directly abutting the respective ends of the spring, said washers being also respectively abuttable with each of the corresponding stop elements of the first and second sets.

3. The combination defined in claim 1 wherein the support means for the first set of stop elements comprises an elongated inner tubular member surrounding the rod and in turn surrounded by the spring and by the retainer washers in longitudinally sliding relationship with such washers, the end of the inner tubular member opposite the mounting fixture being fixed to the rod.

4. The combination defined in claim 3 wherein the rod is externally threaded and the inner tubular member is threaded internally at said end of engagement with the rod threads in order to permit longitudinal adjustment of the relative position between them.

5. The combination defined in claim 2 wherein the support means for the first set of stop elements comprises an elongated inner tubular member surrounding the rod and in turn surrounded by the spring and by the retainer washers in longitudinally sliding relationship with such washers, the end of the inner tubular members opposite the mounting fixture being fixed to the rod.

6. The combination defined in claim 5 wherein the rod is externally threaded and the inner tubular member is threaded internally at said end for engagement with the rod threads in order to permit longitudinal adjustment of the relative position between them.

7. The combination defined in claim 1 wherein the terminal fixture includes mounting bracket means having side portions pivotally connected to the tubular outer member to permit pivoting of the tubular outer member thereon about an axis transverse to such member, and having an end portion interconnecting said side portions and apertured to pass said mounting fixture therethrough, said mounting bracket means being adapted for interconnection with said mounting fixture.

8. The combination defined in claim 1 wherein the spring is retained in partially compressed condition between said opposing abutment means with the cable members positioning the actuatable device in neutral position.

9. The combination defined in claim 2 wherein the spring is retained in partially compressed condition between said opposing abutment means with the cable members positioning the actuatable device in neutral position.

10. A self-centering mechanism for a push-pull coaxial cable mechanism adapted to move an actuatable device reversibly into either of opposite extreme positions and an intermediate neutral position, wherein said cable mechanism includes an inner core cable member slidably received within an outer tubular guide cable member, and a cable mechanism terminal assembly including an outer mounting fixture terminating said outer cable member and a device actuator rod terminating said inner cable member and projecting reciprocatively through said fixture by distances beyond the latter that vary with longitudinal actuator device positioning movement between the cable members;

said self-centering mechanism comprising an elongated outer tubular member having mounting means at one end adapted for interconnection coaxially with said mounting fixture with said tubular member surrounding said rod, an elongated helical spring extending longitudinally within said outer tubular member, and opposing abutment means at opposite ends of the spring including opposing elements operable on the spring by relative approach and separation movement between said elements to vary the degree of compressive shortening of the spring, said abutment means including a first set of stop elements and support means for said stop elements maintaining the same in longitudinally spaced relationship, said support means comprising an elongated inner tubular member extending slidably through the spring and having mounting means at one end adapted for interconnection with the projecting end of the rod, with said inner tubular member extending lengthwise of and surrounding said rod, said abutment means further including a second set of opposing stop elements carried by said outer tubular member in longitudinally spaced relationship therein at least approximating the longitudinal spacing between the stop elements of the first set.

11. The mechanism defined in claim 10 including retainer collars carried slidably on the inner tubular member and directly abutting the respective ends of the spring, said collars being also respectively abuttable with each of the corresponding stop elements of the first and second sets.

12. The combination defined in claim 11 wherein said end of the internal tubular member is internally threaded for threaded engagement with the cable actuator rod externally threaded.

13. The combination defined in claim 12 wherein the terminal fixture includes mounting bracket means having side portions pivotally connected to the tubular outer member to permit pivoting of the tubular outer member thereon about an axis transverse to such member, and having an end portion interconnecting said side portions and apertured to pass said mounting fixture therethrough, said mounting bracket means being adapted for interconnection with said mounting fixture.

14. The combination defined in claim 10 wherein the spring is retained in partially compressed condition between said opposing abutment means with the cable members positioning the actuatable device in neutral position.

15. The combination defined in claim 11 wherein the spring is retained in partially compressed condition between said opposing abutment means with the cable members positioning the actuatable device in neutral position.

* * * * *

UNITED STATES PATENT AND TRADEMARK OFFICE
CERTIFICATE OF CORRECTION

PATENT NO. : 4,223,564

DATED : September 23, 1980

INVENTOR(S) : Harry E. Fawcett

It is certified that error appears in the above–identified patent and that said Letters Patent are hereby corrected as shown below:

Column 6, line 26: "of" is changed to --for--.

Signed and Sealed this

Third Day of February 1981

[SEAL]

Attest:

RENE D. TEGTMEYER

Attesting Officer

Acting Commissioner of Patents and Trademarks